US009122065B2

(12) United States Patent
Uehara et al.

(10) Patent No.: US 9,122,065 B2
(45) Date of Patent: Sep. 1, 2015

(54) DISPLAY PANEL, DISPLAY AND ELECTRONIC DEVICE

(75) Inventors: Toshinori Uehara, Tottori (JP); Hideki Kaneko, Tottori (JP); Kojiro Ikeda, Tottori (JP); Daichi Suzuki, Tottori (JP)

(73) Assignee: JAPAN DISPLAY INC., Tokyo (JP)

( * ) Notice: Subject to any disclaimer, the term of this patent is extended or adjusted under 35 U.S.C. 154(b) by 126 days.

(21) Appl. No.: 13/444,035

(22) Filed: Apr. 11, 2012

(65) Prior Publication Data

US 2012/0262362 A1 Oct. 18, 2012

(30) Foreign Application Priority Data

Apr. 18, 2011 (JP) ................................ 2011-091845

(51) Int. Cl.
*G09G 3/28* (2013.01)
*G09G 3/32* (2006.01)
*G02B 27/22* (2006.01)
*H04N 13/04* (2006.01)

(52) U.S. Cl.
CPC ........ *G02B 27/2214* (2013.01); *H04N 13/0409* (2013.01); *G09G 3/28* (2013.01); *G09G 3/32* (2013.01)

(58) Field of Classification Search
CPC ..... G02G 3/003; G02B 27/2214; G09G 3/20; G09G 3/28; G09G 3/32; G09G 3/34; G09G 3/3607; G09G 3/364; G09G 2300/0452; G09G 2300/0439; H04N 13/0409

USPC .................................. 345/30, 55, 84, 87–88
See application file for complete search history.

(56) References Cited

U.S. PATENT DOCUMENTS

| | | | | |
|---|---|---|---|---|
| 6,023,277 A | * | 2/2000 | Osaka et al. | 345/419 |
| 2007/0291054 A1 | * | 12/2007 | Shin et al. | 345/694 |
| 2010/0007723 A1 | * | 1/2010 | Yasui | 348/59 |
| 2010/0066646 A1 | * | 3/2010 | Ota | 345/9 |
| 2010/0118045 A1 | * | 5/2010 | Brown Elliott et al. | 345/589 |

FOREIGN PATENT DOCUMENTS

| | | |
|---|---|---|
| JP | 08-106070 | 4/1996 |
| JP | 09-281440 | 10/1997 |
| JP | 2008-089631 | 4/2008 |
| JP | 2009-003256 | 1/2009 |

OTHER PUBLICATIONS

Japanese Office Examination report issued in connection with related Japanese Patent Application No. 2011-091845 dated Sep. 9, 2014.

* cited by examiner

*Primary Examiner* — Lun-Yi Lao
*Assistant Examiner* — Jarurat Suteerawongsa
(74) *Attorney, Agent, or Firm* — Dentons US LLP

(57) ABSTRACT

A display panel includes: a panel section including a plurality of pixels disposed in a row direction and a column direction; and a barrier section including light blocking regions and light transmitting regions alternately disposed in the row direction and the column direction, wherein each of the pixels emits light of four colors, and has two sub-pixels for each of the four colors.

6 Claims, 13 Drawing Sheets

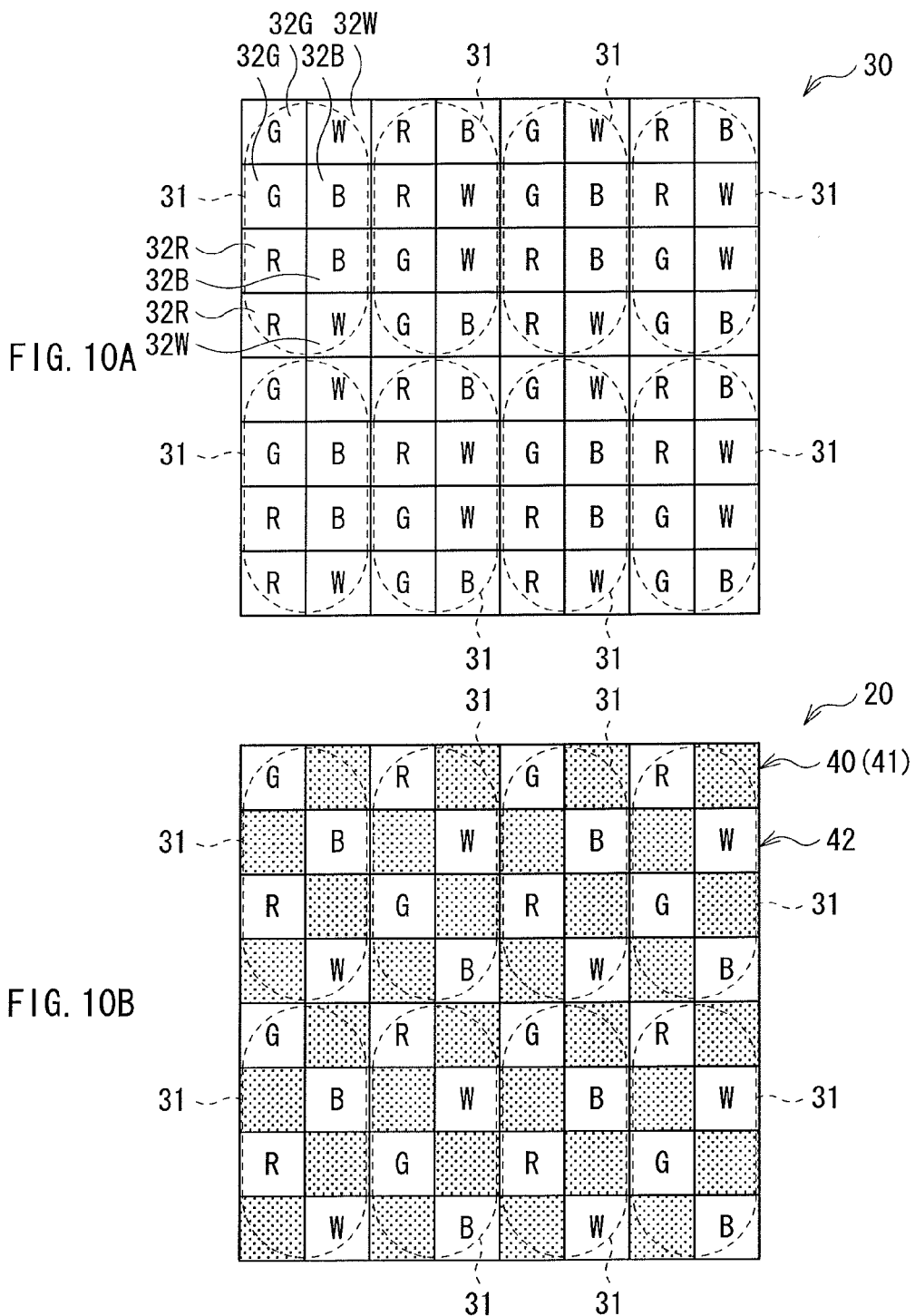

DISPLAY PANEL, DISPLAY AND ELECTRONIC DEVICE

BACKGROUND

The present disclosure relates to a display panel capable of performing multi view display which allows different two-dimensional images (planar images) to be visually recognized from respective perspectives, or performing three-dimensional display which allows a three-dimensional image (stereoscopic image) to be visually recognized from a particular perspective, and a display including the display panel. In addition, the present disclosure relates to an electronic device including the above-mentioned display.

In recent years, displays capable of performing multi view display or three-dimensional display have come into practical use. As one of such displays, for example, a display panel in which a barrier layer is provided on a display region is known. As one of such a barrier layer, for example, a barrier layer that is provided with a plurality of light-transmissive slits partitioned by light blocking regions is disclosed in Japanese Unexamined Patent Application Publication No. Hei 9-281440. In addition, for example, a barrier liquid crystal in which a light blocking region is generated when a voltage is applied to a liquid crystal is disclosed in Japanese Unexamined Patent Application Publication No. Hei 8-106070.

SUMMARY

In providing the above-mentioned barrier layer, when each pixel is composed of, for example, four colors of sub-pixels, such as sub-pixels of RGBW, in a row direction and a column direction, the distance between the pixel and the barrier layer is allowed to be increased compared to the case where sub-pixels are arranged in a striped structure of three colors of RGB. As a result, processing margin is allowed to be increased in the case where a CF (Color Filter) substrate of a display panel is processed until it has a thickness corresponding to the distance between the pixel and the barrier layer. However, in the case where a known barrier pattern having a checkered pattern (a pattern in which light blocking regions and light transmitting regions are alternately arranged in a row direction and a column direction) are used as a barrier layer, there is an issue that some of the four colors are blocked by the barrier pattern and therefore color separation of perspective is not performed.

It is desirable to provide a display panel capable of performing color separation of perspective in the case where each pixel is configured to have a four-color configuration, and a display and an electronic device including the display panel.

According to an embodiment of the present disclosure, there is provided a display panel including: a panel section including a plurality of pixels disposed in a row direction and a column direction; and a barrier section including light blocking regions and light transmitting regions alternately disposed in the row direction and the column direction, wherein each of the pixels emits light of four colors, and has two sub-pixels for each of the four colors.

According to an embodiment of the present disclosure, there is provided a display including: a panel section including a plurality of pixels disposed in a row direction and a column direction; a barrier section including light blocking regions and light transmitting regions alternately disposed in the row direction and the column direction; and a driving section driving the panel section or both of the panel section and the barrier section, wherein each of the pixels emits light of four colors, and has two sub-pixels for each of the four colors.

According to an embodiment of the present disclosure, there is provided an electronic device with a display, the display including: a panel section including a plurality of pixels disposed in a row direction and a column direction; a barrier section including light blocking regions and light transmitting regions alternately disposed in the row direction and athe column direction; and a driving section driving the panel section or both of the panel section and the barrier section, wherein each of the pixels emits light of four colors, and has two sub-pixels for each of the four colors.

In the display panel, display and electronic device of an embodiment of the present disclosure, two sub-pixels are provided for each color in each pixel. For example, two sub-pixels of the same color among the four colors provided in each of the pixels are continuously disposed in the row direction or the column direction in each pixel, or continuously disposed in the row direction or the column direction all over the pixels. This allows all colors to pass through the barrier layer even in the case where a barrier pattern having a known checkered pattern (a pattern in which light blocking regions and light transmitting regions are alternately arranged in a row direction and a column direction) is adopted as a barrier layer.

According to the display panel, display and electronic device of an embodiment of the present disclosure, all colors may pass through the barrier layer even in the case where a barrier pattern having a known checkered pattern is adopted. Consequently, color separation of perspective is performed in the case where each pixel has a four-color configuration.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

Figure 8A:
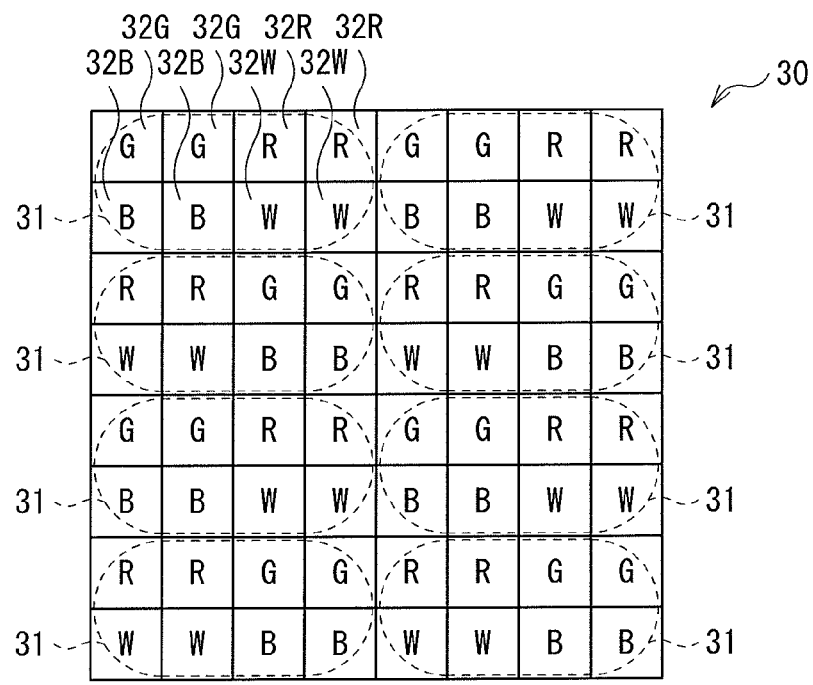
FIG. 8A is a view illustrating a second modification of the planar configuration of the panel section of FIG. 2, and FIG.

8B is a view schematically illustrating a state of a display panel using the panel section of FIG. 8A.

Figure 2:
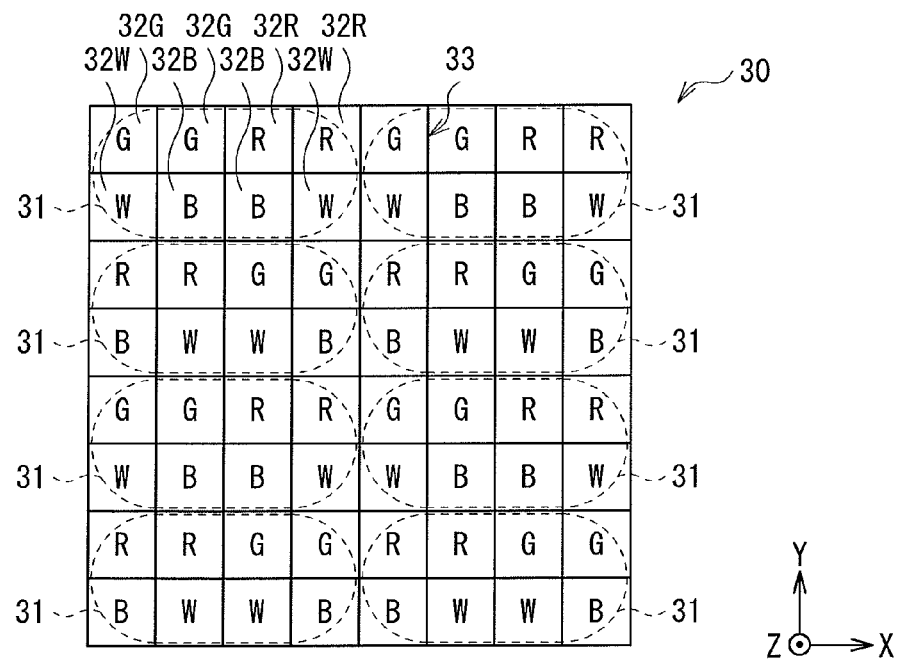
FIG. 2 is a view illustrating an exemplary planar configuration of a panel section of FIG. 1.
Figure 9A:
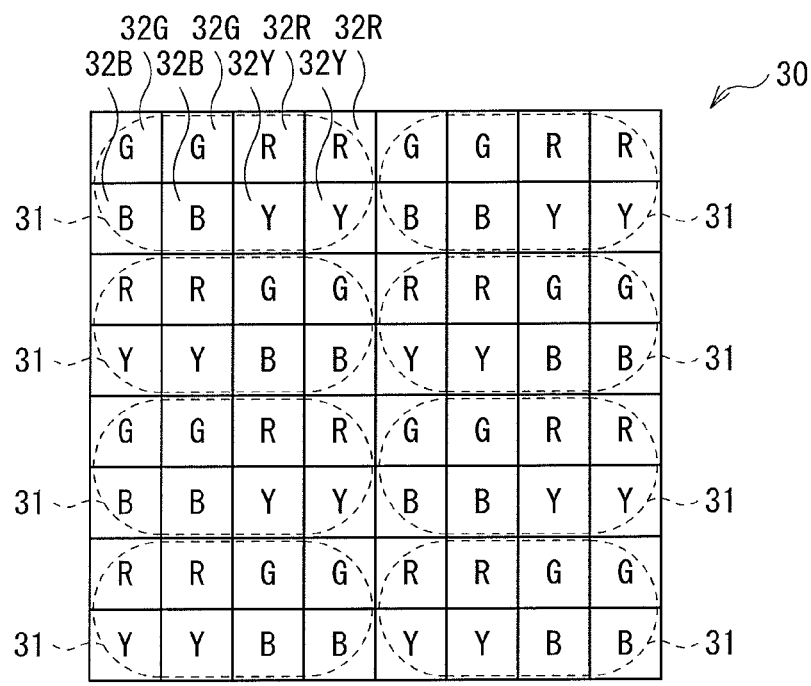
Figure 9B:
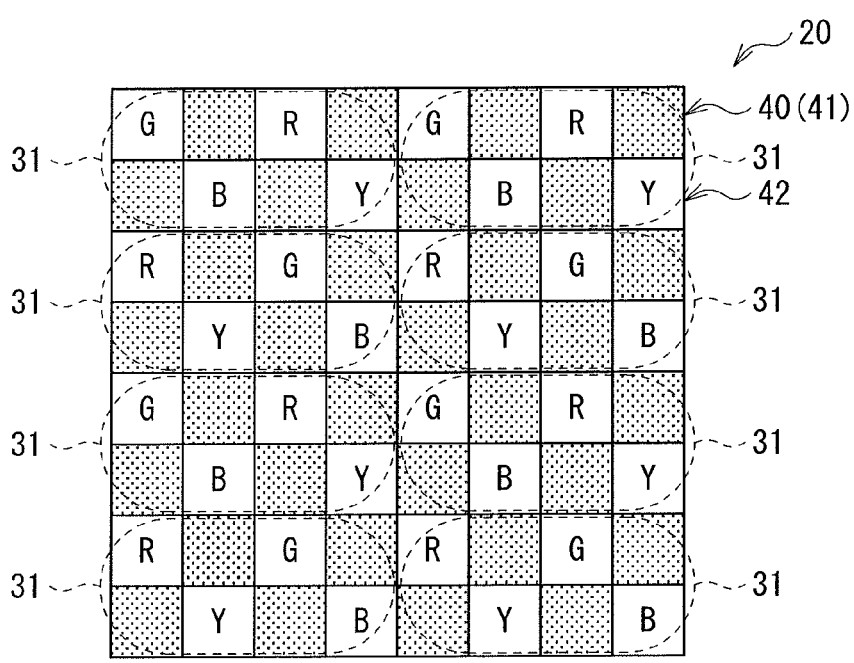

FIG. 9A is a view illustrating a third modification of the planar configuration of the panel section of FIG. 2, and FIG. 9B is a view schematically illustrating a state of a display panel using the panel section of FIG. 9A.

FIG. 10A is a view illustrating a fourth modification of the planar configuration of the panel section of FIG. 2, and FIG. 10B is a view schematically illustrating a state of a display panel using the panel section of FIG. 10A.

Figures 11A, 11B:
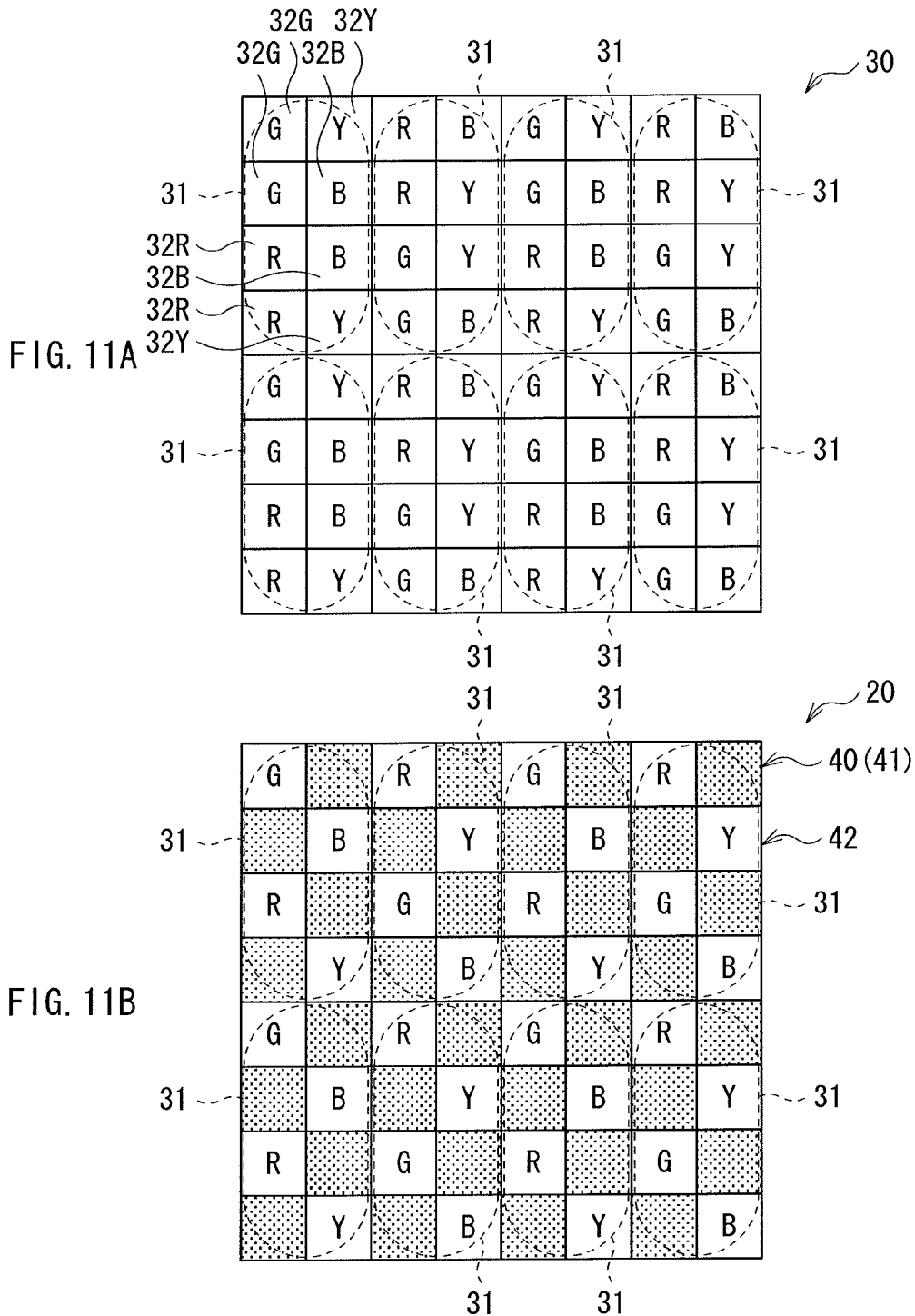

FIG. 11A is a view illustrating a fifth modification of the planar configuration of the panel section of FIG. 2, and FIG. 11B is a view schematically illustrating a state of a display panel using the panel section of FIG. 11A.

Figure 12A:
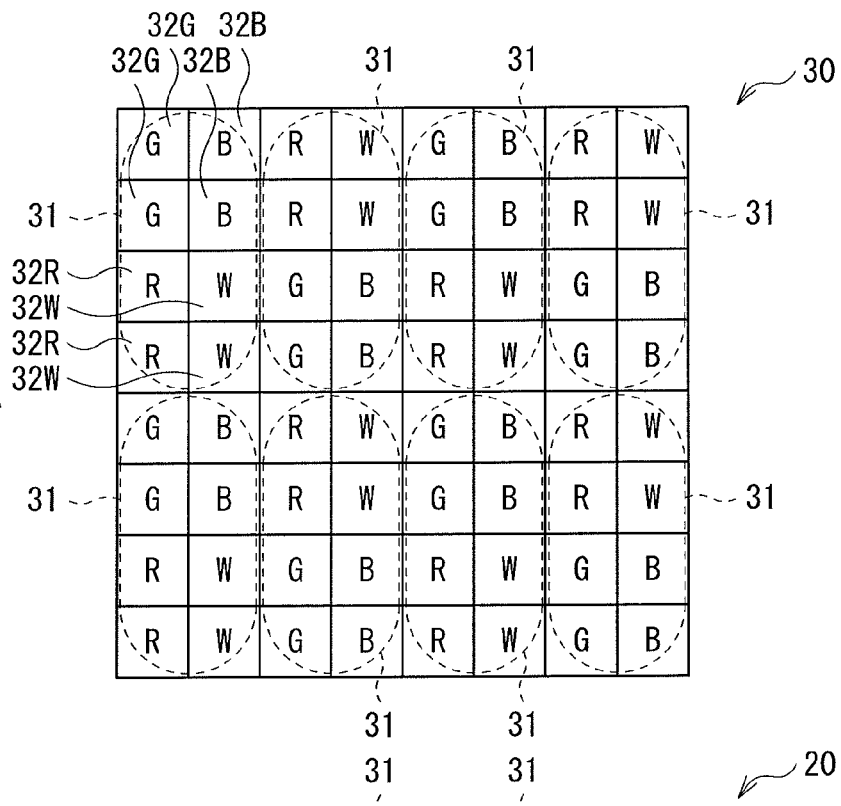
Figure 12B:
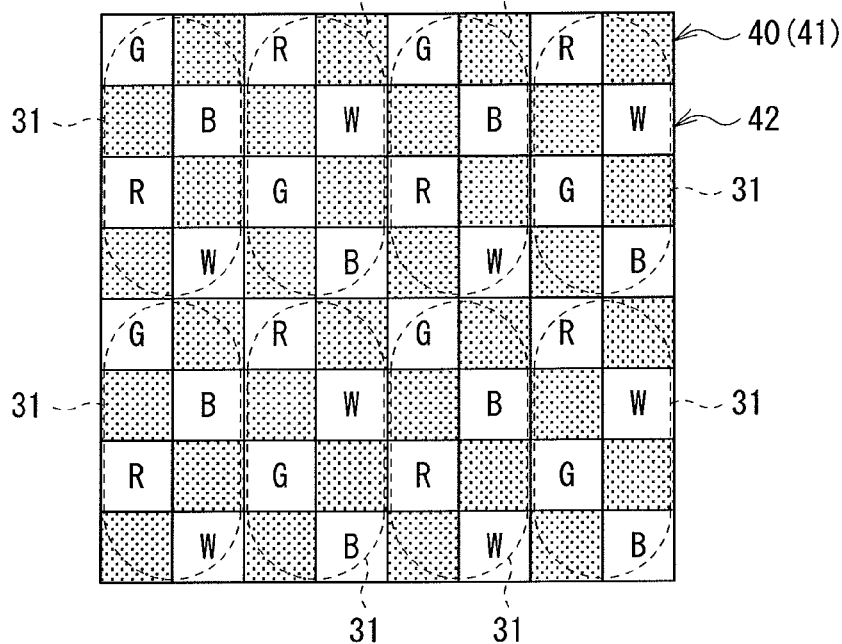

FIG. 12A is a view illustrating a sixth modification of the planar configuration of the panel section of FIG. 2, and FIG. 12B is a view schematically illustrating a state of a display panel using the panel section of FIG. 12A.

Figure 13A:
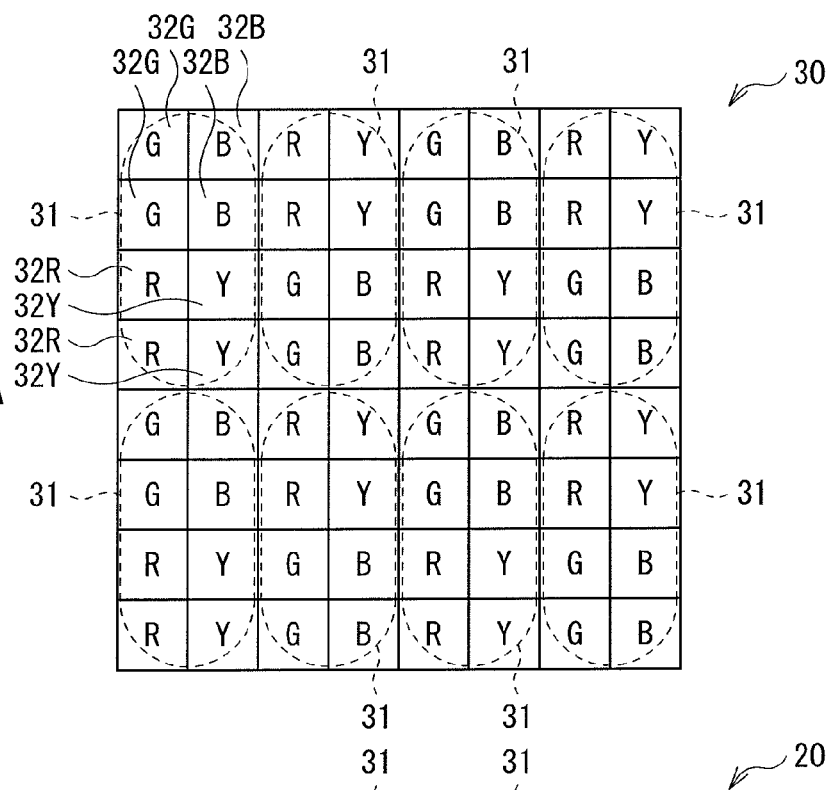
Figure 13B:
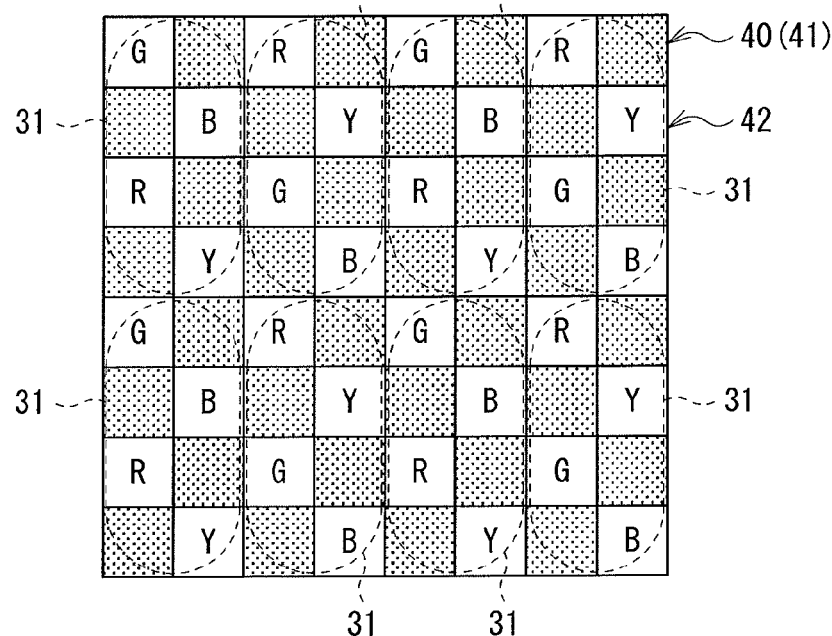

FIG. 13A is a view illustrating a seventh modification of the planar configuration of the panel section of FIG. 2, and FIG. 13B is a view schematically illustrating a state of a display panel using the panel section of FIG. 13A.

Figure 14:
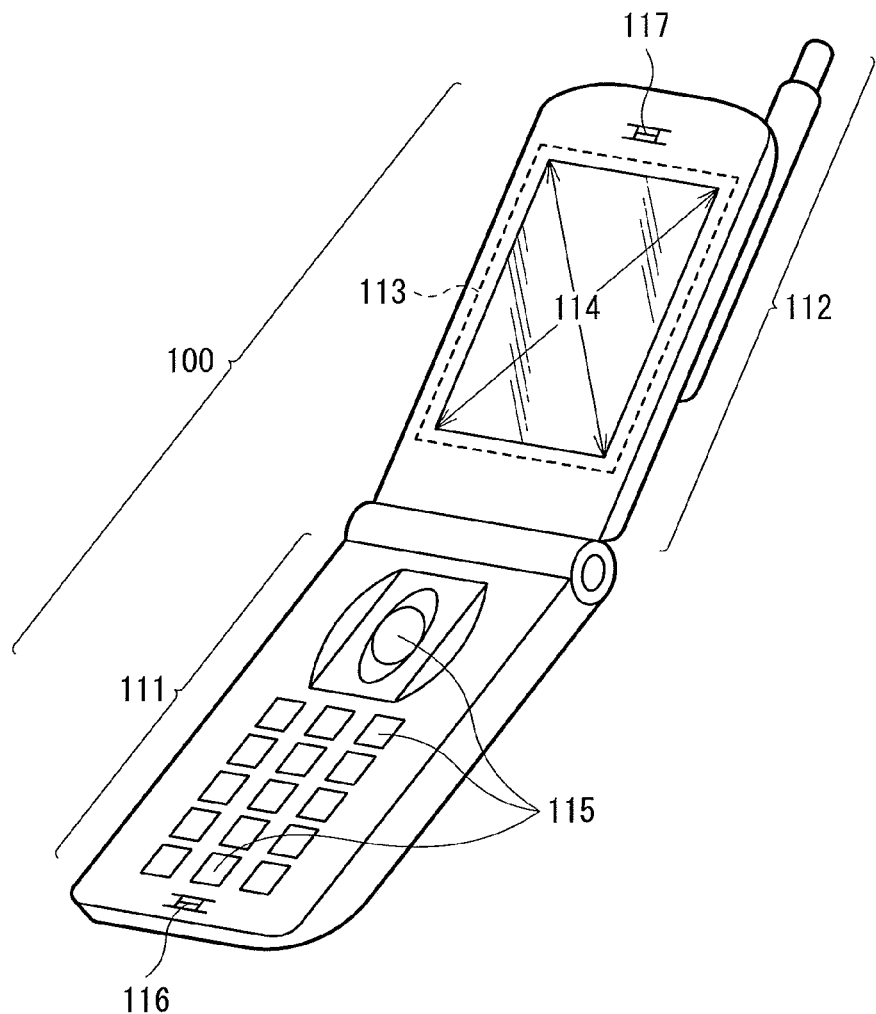

FIG. 14 is a perspective view illustrating an exemplary electronic device according to an application example.

Figures 15, 16:
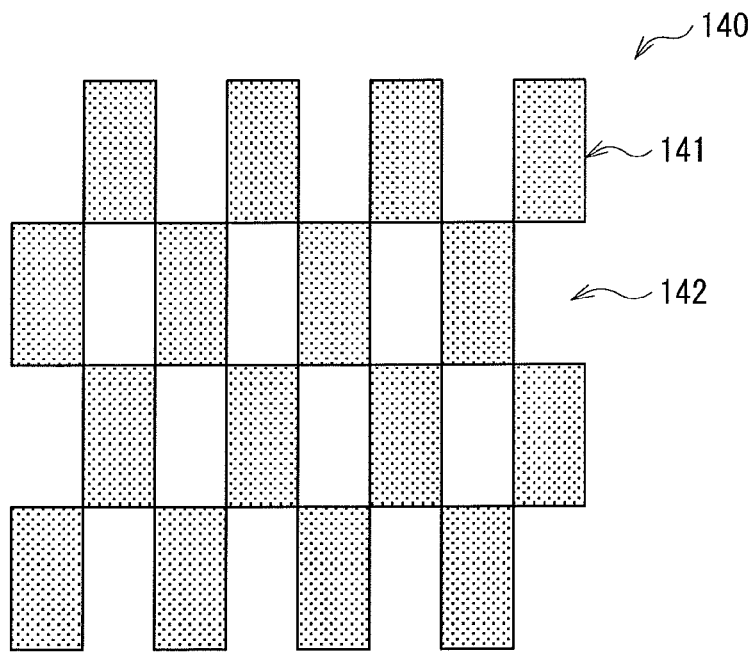

FIG. 15 is a view illustrating an exemplary planar configuration of a panel section according to a comparative example.

FIG. 16 is a view illustrating an exemplary planar configuration of a barrier section according to a comparative example.

Figure 17:
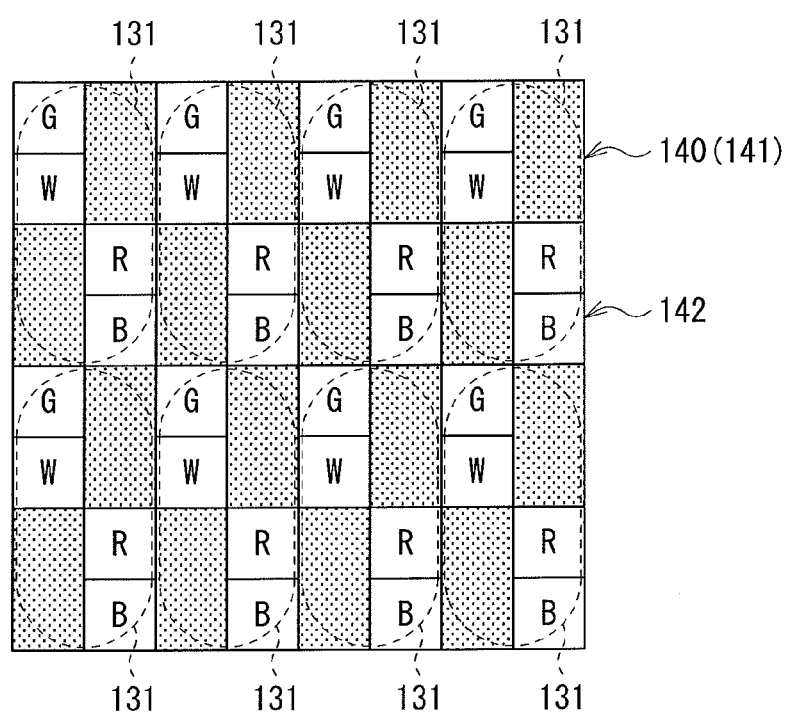

FIG. 17 is a view illustrating a state of pixels when the panel section of FIG. 15 and the barrier section of FIG. 16 are overlapped with each other.

DETAILED DESCRIPTION

An embodiment of the present disclosure will be described in detail below with reference to the figures. Description will be given in the following order.
1. Embodiment (FIG. 1 to FIG. 6)
2. Modification (FIG. 7A to FIG. 13B)
3. Application Example (FIG. 14)

Embodiment

[Configuration]

Figure 1:
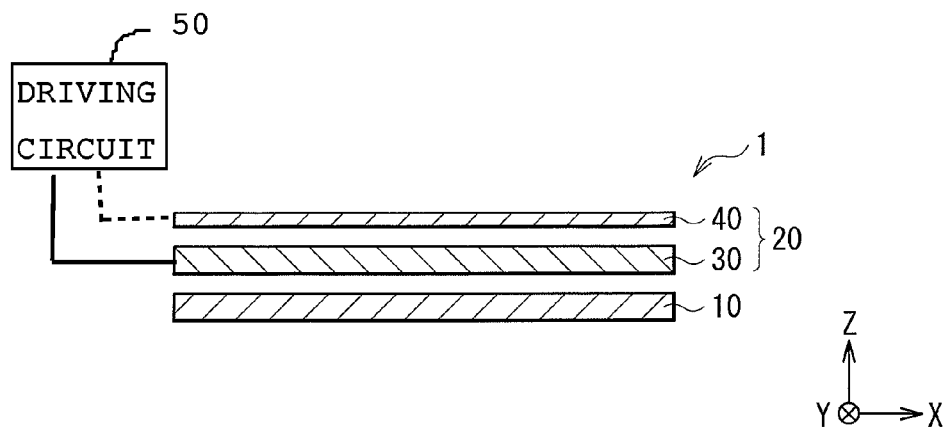
FIG. 1 is a view illustrating an exemplary cross-sectional configuration of a display according to an embodiment of the present disclosure.

FIG. 1 illustrates an exemplary cross-sectional configuration of a display 1 according to an embodiment. It is to be noted that, FIG. 1 is a schematic view, and actual size and form are not necessarily the same. The display 1 includes a display panel 20, a backlight 10 disposed in the rear of the display panel 20, and a driving circuit 50 that drives the display panel 20. The backlight 10 is a surface-emitting light source that illuminates the display panel 20 from the rear. The upper face of the display panel 20 is an image display face. The display panel 20 has a panel section 30 and a barrier section 40.

Figure 3:
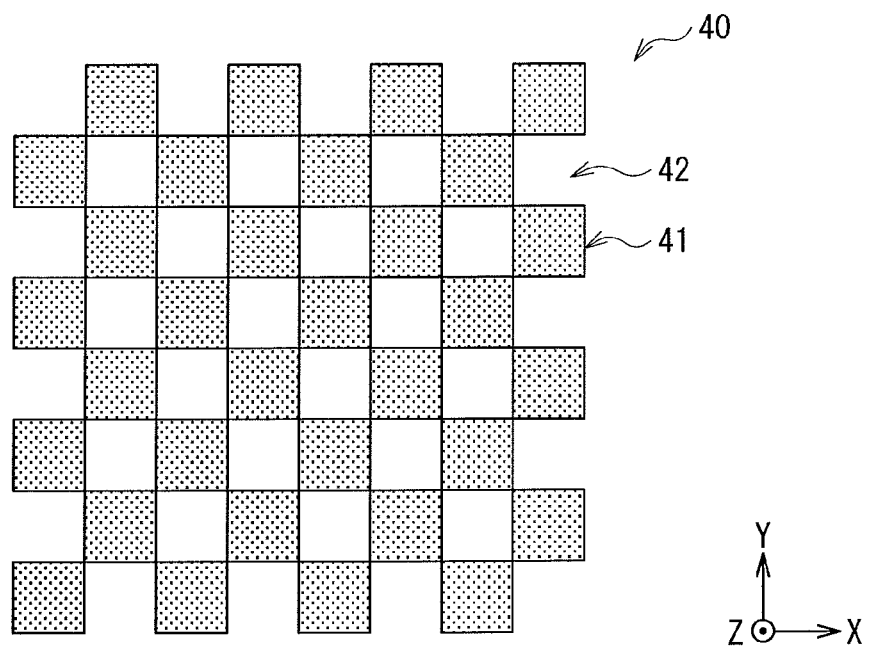
FIG. 3 is a view illustrating an exemplary planar configuration of a barrier section of FIG. 1.

FIG. 2 illustrates an exemplary planar configuration of the panel section 30 of FIG. 1. FIG. 3 illustrates an exemplary planar configuration of the barrier section 40 of FIG. 1.

The panel section 30 is a transmissive panel in which each pixel 31 is driven based on an externally inputted image signal. The panel section 30 is configured by, for example, a liquid crystal panel, an organic EL (Electro-Luminescence) panel, or a plasma panel. In the case where the panel section 30 includes a self-luminous mechanism such as an organic EL panel and a plasma panel, the backlight 10 may be omitted. The panel section 30 has, for example, a rectangular shape with four sides as shown in FIG. 2. It is to be noted that, in the following description, of the four sides of the panel section 30, two sides opposite to each other are parallel to the horizontal direction, and remaining two sides are parallel to the vertical direction. In addition, in the following description, the horizontal direction is sometimes referred to as a right-left direction, or a row direction, and the vertical direction is sometimes referred to as an up-down direction or a column direction.

The panel section 30 has a display region in which a plurality of pixels 31 are disposed in a row direction and a column direction, and has an annular frame region in a peripheral region thereof. Each of the pixels 31 provided in the display region emits light of four colors, and has two sub-pixels for each of the four colors. For example, each of the pixels 31 emits light of red, green, blue and white. For example, each of the pixels 31 is composed of two sub-pixels 32R for red, two sub-pixels 32G for green, two sub-pixels 32B for blue, and two sub-pixels 32W for white, as shown in FIG. 2. It is to be noted that, in the following description, "sub-pixel 32" is used as a collective term of the sub-pixels 32R, 32G, 32B, and 32W.

The arrangement of the sub-pixels 32 included in each of the pixels 31 differs from stripe arrangement. Two sub-pixels 32 of the same color provided in each pixel 31 are continuously disposed in the row direction all over the pixels 31 in the display region. A black 33 serving as a light blocking section is disposed between the pixels 31, and between the sub-pixels 32. The black 33 is formed in a grid pattern as shown in FIG. 2A for example.

The barrier section 40 blocks a part of light (image light) emitted from the pixels 31 of the panel section 30. At the time of dual view display, the barrier section 40 blocks some of the pixels 31 and thus allows a viewer H to visually recognize different two-dimensional images (planar images) from respective two preferred viewing directions (d1 and d2 described later) (see FIG. 4). At this time, the display 1 serves as a so-called dual-view display. On the other hand, at the time of three-dimensional display, the barrier section 40 blocks some of the pixels 31 and allows a right eye e1 and a left eye e2 of the viewer H to visually recognize respective different two-dimensional images (planar images) (see FIG. 5). At this time, the display 1 serves as a so-called three-dimensional display.

For example, the barrier section 40 is disposed at a position facing the panel section 30, as shown in FIG. 1. For example, the barrier section 40 has a barrier pattern in which a plurality of light transmitting regions 42 are two-dimensionally disposed, and light blocking regions 41 are disposed around each light transmitting region 42, as shown in FIG. 3.

For example, the light blocking regions 41 are configured by a light blocking member. On the other hand, the light transmitting regions 42 are, for example, apertures. The light transmitting regions 42 are regularly disposed as a whole, and two-dimensionally disposed in the row direction and the column direction. For example, the light blocking regions 41 and the light transmitting regions 42 are disposed in a checkered pattern (that is, they are alternately disposed in the row direction and the column direction), as shown in FIG. 3. The light blocking regions 41 are the same in width both in the row direction and the column direction.

Figure 4:
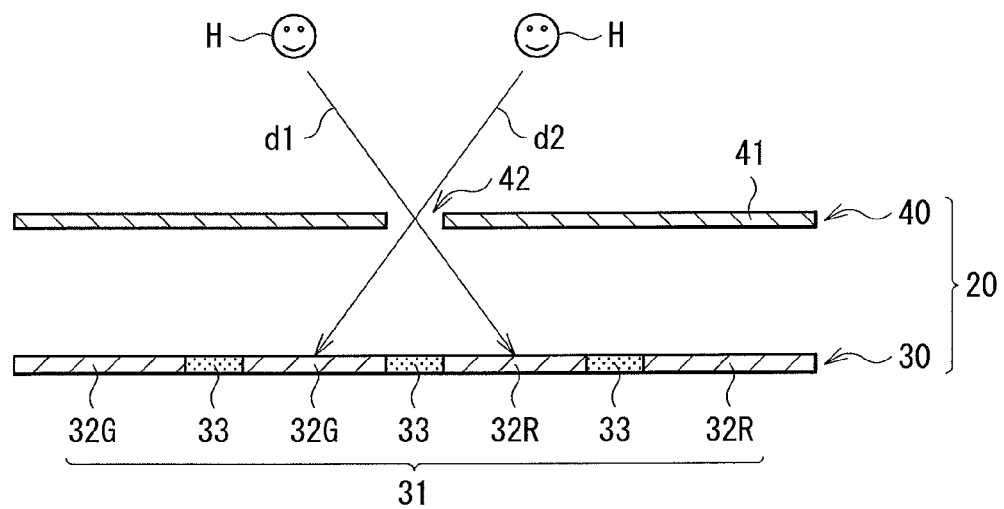
FIG. 4 is a view illustrating an exemplary cross-sectional configuration of the panel section and the barrier section at the time of dual view display.
Figure 5:
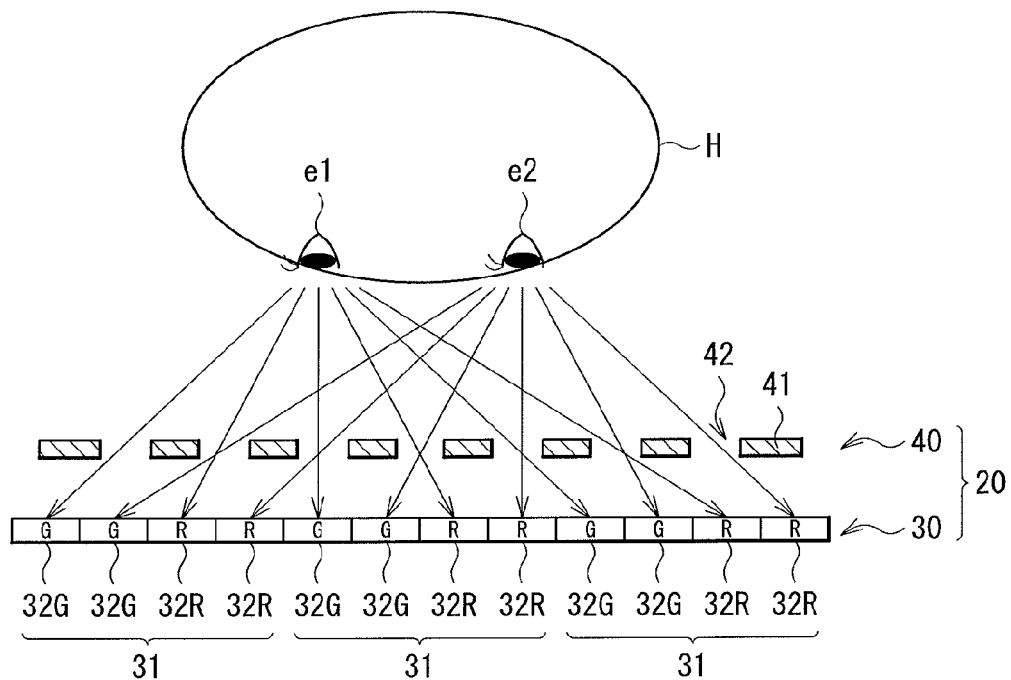
FIG. 5 is a view illustrating an exemplary cross-sectional configuration of the panel section and the barrier section at the time of three-dimensional display.

For example, each of the light transmitting regions 42 is disposed at a position corresponding to the sub-pixel 32, as shown in FIG. 4 and FIG. 5. Further, for example, each of the light transmitting regions 42 has an area smaller than that of the sub-pixel 32, as shown in FIG. 4 and FIG. 5.

Figure 6:
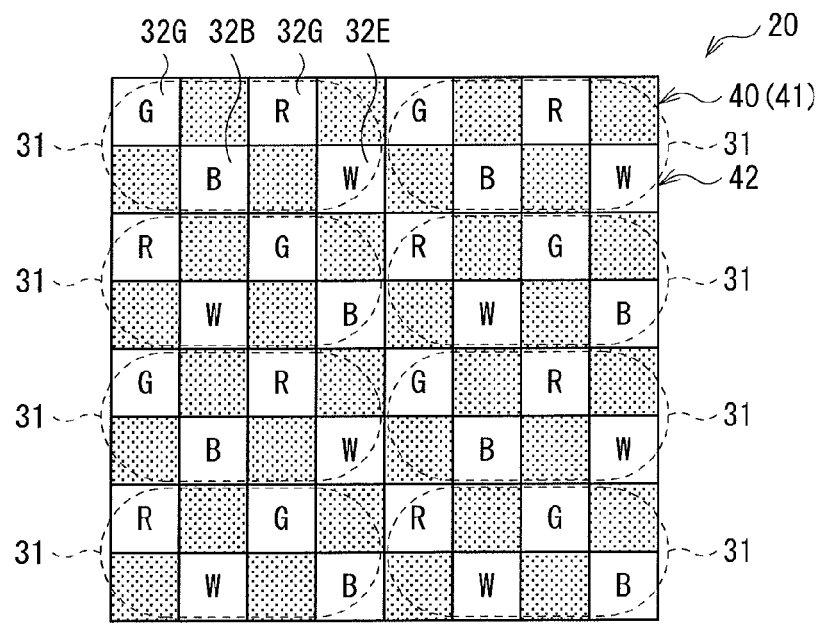
FIG. 6 is a view schematically illustrating a state of a display panel when it is viewed from a particular preferred viewing direction in FIG. 4 or when it is viewed from a right eye or a left eye in FIG. 5.

At the time of dual view display, as shown in FIG. 4, the barrier section 40 is disposed at a position at which, when the viewer H views the display panel 20 from a first preferred viewing direction d1, each of specified sub-pixels 32 is viewed in part or in its entirety through respective light transmitting regions 42. Further, at the time of dual view display, as shown in FIG. 4, the barrier section 40 is disposed at a position at which, when the viewer H views the display panel 20 from a second preferred viewing direction d2, each of sub-pixels 32 different from the just-mentioned sub-pixels 32 is viewed in part or in its entirety through respective light transmitting regions 42. In other words, each of the light transmitting regions 42 is configured to allow, when the viewer H views the display panel 20 from the first preferred viewing direction d1 or the second preferred viewing direction d2, visual recognition of the whole or a part of one of sub-pixels 32 different from each other via one light transmitting region 42. At this time, when viewing the display panel 20 from the first preferred viewing direction d1 or the second preferred viewing direction d2, the viewer H may visually recognize sub-pixels 32 of four colors of RGBW for each pixel 31, as shown in FIG. 6, for example.

At the time of three-dimensional display, as shown in FIG. 5, the barrier section 40 is disposed at a position at which, when the viewer H views the display panel 20 by the right eye e1, each of specified sub-pixels 32 is viewed in part or in its entirety through respective light transmitting regions 42. Further, as shown in FIG. 5, at the time of three-dimensional display, the barrier section 40 is disposed at a position at which, when the viewer H views the display panel 20 by the left eye e2, each of sub-pixels 32 different from the just-mentioned sub-pixels 32 is viewed in part or in its entirety through respective light transmitting regions 42. In other words, each of the light transmitting regions 42 is configured to allow, when the viewer H views the display panel 20 by the right eye e1 or the left eye e2, visual recognition of the whole or a part of one of sub-pixels 32 different from each other via one light transmitting region 42. At this time, when viewing the display panel 20 by the right eye e1 or the left eye e2, the viewer H may visually recognize sub-pixels 32 of four colors of RGBW for each pixel 31, as shown in FIG. 6, for example.

[Operation]

In the present embodiment, light outputted from the backlight 10 is modulated by each pixel 31 of the panel section 30, and specified image light is emitted to the barrier section 40. Thereafter, the image light is partially blocked by the light blocking region 41 of the barrier section 40, and light that has passed through the light transmitting region 42 is outputted from an image display face of the display panel 20. For example, in the case where the barrier section 40 is for dual view display, the light outputted from the image display face is formed at a specified position (perspective) on a line segment parallel to the first preferred viewing direction d1, and thus a two-dimensional image (planar image) is created. Further, for example, the light outputted from the image display face is formed at a specified position (perspective) on a line segment parallel to the second preferred viewing direction d2, and thus a two-dimensional image (planar image) is created. In addition, in the case where the barrier section 40 is for three-dimensional display, for example, the light outputted from the image display face is formed at a position (perspective) of the right eye e1, and thus a two-dimensional image (planar image) is created. Further, the light outputted from the image display face is formed at a position (perspective) of the left eye e2, and thus a two-dimensional image (planar image) is created. In this manner, the viewer H is allowed to visually recognize a three-dimensional image.

[Effect]

In the present embodiment, each pixel 31 is provided with two sub-pixels 32 for each color. For example, two sub-pixels 32 of the same color provided in each pixel 31 are continuously disposed in the row direction or the column direction in each pixel 31, or, continuously disposed in the row direction or the column direction all over the pixels 31 in the display region. This allows all colors to pass through the barrier layer 40, even in the case where a barrier pattern having a known checkered pattern (a pattern in which light blocking regions and light transmitting regions are alternately arranged in a row direction and a column direction) is adopted as the barrier layer 40. As a result, it is possible to perform color separation of perspective in the case where each pixel 31 is configured to have a four-color configuration.

There is another possible method of performing the color separation of perspective other than that of the present embodiment. For example, as shown in FIG. 15, a panel section 130 in which blocks of RGBW are arranged in a row direction and a column direction is prepared and each pixel 131 thereof is composed of two blocks. In addition, as shown in FIG. 16, a barrier section 140 is prepared in which light blocking regions 141 and light transmitting regions 142 elongated in the column direction are arranged in a row direction and a column direction. Then, as shown in FIG. 17, the display panel 130 and the barrier section 140 are overlapped with each other. In this way, the color separation of perspective may also be performed in the case where each pixel 31 is configured to have a four-color configuration. However, in that case, since the light blocking regions 141 are elongated in the column direction, definition in the column direction and definition in the row direction are different from each other.

On the other hand, in the present embodiment, since the light blocking regions 41 of the barrier section 40 are the same in width both in the row direction and the column direction, definition in the column direction and definition in the row direction are equal to each other. Accordingly, it is possible to obtain higher image quality in comparison to the case of FIG. 17.

2. Modification

[First Modification]

Figure 7A:
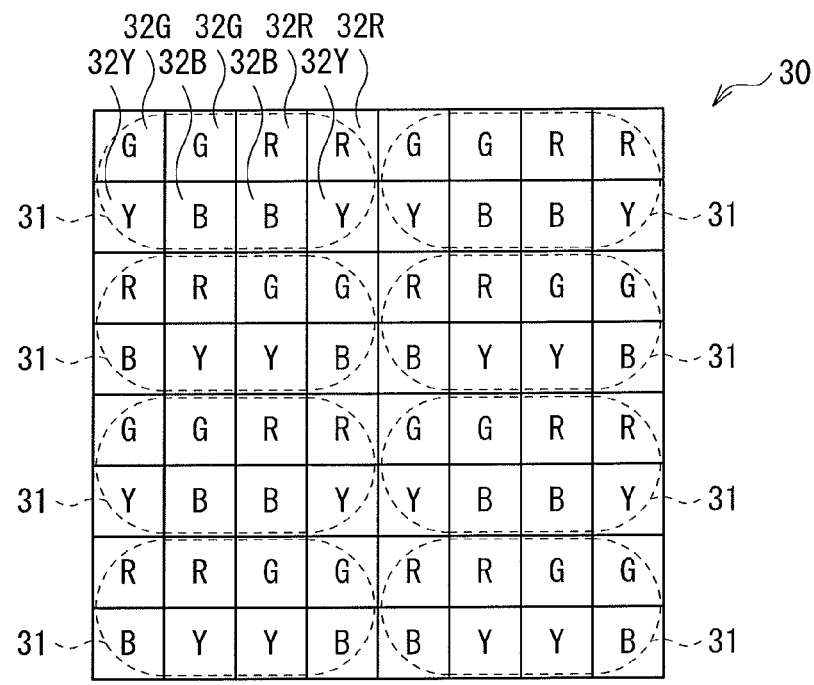
FIG. 7A is a view illustrating a first modification of the planar configuration of the panel section of FIG. 2.

While each pixel 31 emits light of four colors of RGBW in the above-mentioned embodiment, other combinations of colors may be employed. For example, each pixel 31 may emit light of red, green, blue and yellow. In this instance, as shown in FIG. 7A, each pixel 31 is composed of two sub-pixels 32R for red, two sub-pixels 32G for green, two sub-pixels 32B for blue, and two sub-pixels 32Y for yellow, for example. In other words, each pixel 31 has a configuration in which the sub-pixels 32Y are provided in place of the sub-pixels 32W of the above-mentioned embodiment.

Figure 7B:
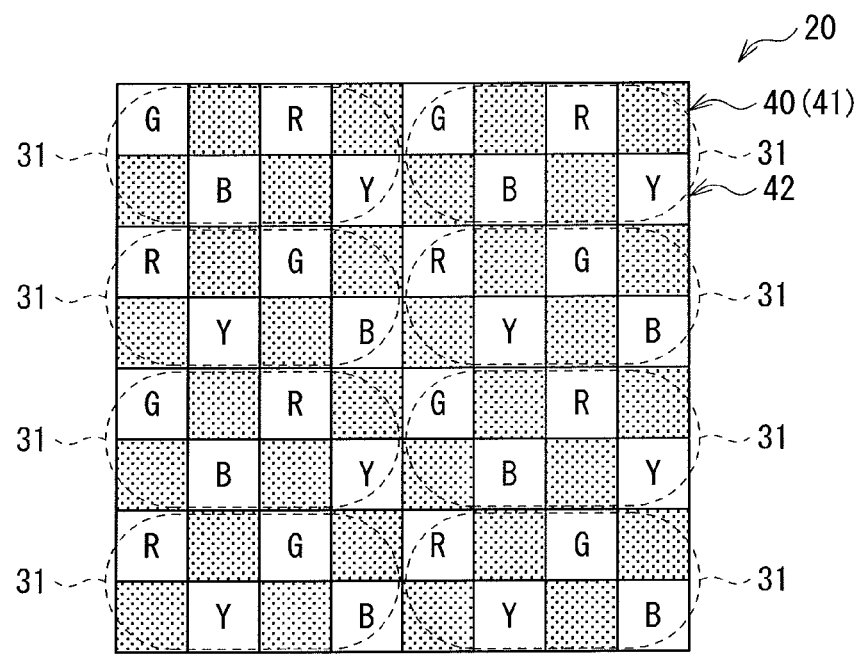
FIG. 7B is a view schematically illustrating a state of a display panel using the panel section of FIG. 7A.

In this instance, when viewing the display panel 20 from the first preferred viewing direction d1 or the second preferred viewing direction d2, the viewer H may visually recognize sub-pixels 32 of four colors of RGBY for each pixel 31, as shown in FIG. 7B, for example. In addition, when viewing the display panel 20 by the right eye e1 or the left eye e2, the viewer H may visually recognize sub-pixels 32 of four colors of RGBY for each pixel 31, as shown in FIG. 7B, for example.

[Second Modification]

While, in the display region in the above-mentioned embodiment, two sub-pixels 32 of the same color provided in each pixel 31 are continuously disposed in the row direction all over the pixels 31 in the display region, they may be continuously disposed in the row direction in each pixel 31. For example, as shown in FIG. 8A, two sub-pixels 32 of the same color are continuously disposed in the row direction in each pixel 31.

Figure 8B:
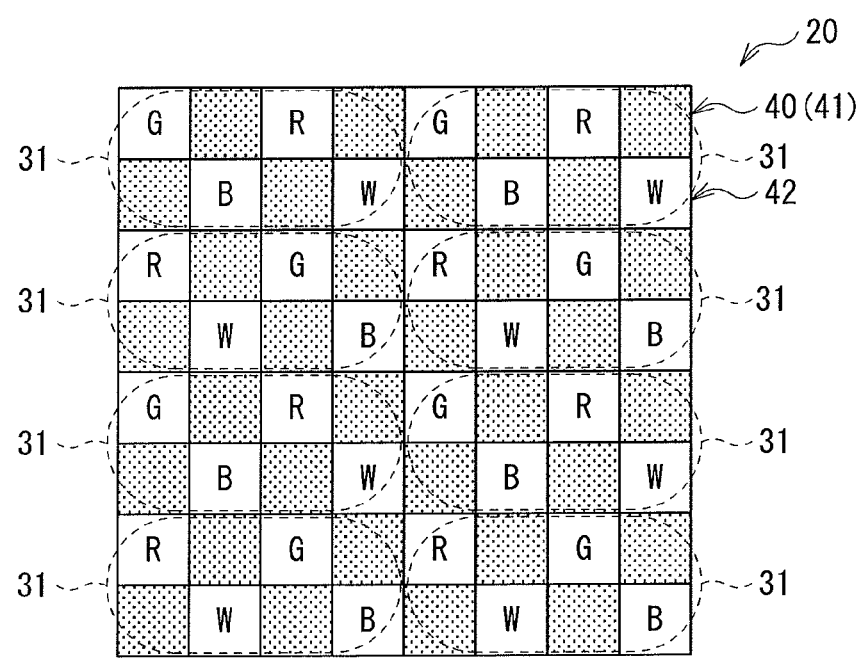

In this instance, when viewing the display panel 20 from the first preferred viewing direction d1 or the second preferred viewing direction d2, the viewer H may visually recognize sub-pixels 32 of four colors of RGBW for each pixel 31, as shown in FIG. 8B, for example. In addition, when viewing the display panel 20 by the right eye e1 or the left eye e2, the viewer H may visually recognize sub-pixels 32 of four colors of RGBW for each pixel 31, as shown in FIG. 8B, for example.

[Third Modification]

While, in the above-mentioned first modification, two sub-pixels 32 of the same color provided in each pixel 31 are continuously disposed in the row direction all over the pixels 31 in the display region, they may also be continuously disposed in the row direction in each pixel 31. For example, as shown in FIG. 9A, two sub-pixels 32 of the same color are continuously disposed in the row direction in each pixel 31.

In this instance, when viewing the display panel 20 from the first preferred viewing direction d1 or the second preferred viewing direction d2, the viewer H may visually recognize sub-pixels 32 of four colors of RGBY for each pixel 31, as shown in FIG. 9B, for example. In addition, when viewing the display panel 20 by the right eye e1 or the left eye e2, the viewer H may visually recognize sub-pixels 32 of four colors of RGBY for each pixel 31, as shown in FIG. 9B, for example.

[Fourth Modification]

In the above-mentioned embodiment and the first to third modifications, two sub-pixels 32 of the same color provided in each pixel 31 are continuously disposed in the row direction, and each pixel 31 is long in the row direction. However, for example, two sub-pixels 32 of the same color provided in each pixel 31 may be continuously disposed in the column direction, and each pixel 31 may be long in the column direction.

For example, as shown in FIGS. 10A and 10B, and FIGS. 11A and 11B, two sub-pixels 32 of the same color provided in each pixel 31 may be continuously disposed in the column direction all over the pixels 31 in the display region. In addition, for example, as shown in FIGS. 12A and 12B, and FIGS. 13A and 13B, two sub-pixels 32 of the same color provided in each pixel 31 may be continuously disposed in the column direction in each pixel 31.

3. Application Example

Next, an application example of a display 1 according to the above-mentioned embodiment and the modifications thereof is described. FIG. 14 is a perspective view illustrating an exemplary schematic configuration of an electronic device 100 according to the present application example. The electronic device 100 is a mobile phone, and includes, for example, a main body section 111 and a display body section 112 that is provided to be openable and closable with respect to the main body section 111, as shown in FIG. 14. The main body section 111 has an operation button 115, and a mouthpiece section 116. The display body section 112 has a display 113 and an earpiece section 117. The display 113 displays various types of display relating to telephone communication on a display screen 114 of the display 113. The electronic device 100 includes a control section (not shown) that controls the operation of the display 113. This control section is provided in the main body section 111 or the display body section 112, as a part of, or separately from, a control section that controls the entire electronic device 100.

The display 113 has the same configuration as the display 1 according to the above-mentioned embodiment and the modifications thereof. This makes it possible to, in the display 113, perform the color separation of perspective when each pixel 31 has a four-color configuration, and besides, it is possible to make definition in the column direction and definition in the row direction equal to each other.

Although the present disclosure has been described above with reference to the embodiment and the modifications and the application example thereof, the present disclosure is not limited to the above-mentioned embodiment and so forth, and various modifications may be made.

For example, in the above-mentioned embodiment, the modifications, and the application example, a typical case in which the light blocking region 41 is configured by a light blocking member, and the light transmitting region 42 is an aperture is described. However, the barrier section 40 may has a dynamic configuration in which the barrier section 40 may control the optical property of the light blocking region 41 on the basis of an externally supplied control signal. In this instance, the driving circuit 50 drives not only the panel section 30 but also the barrier section 40, as shown in FIG. 1.

The display 1 according to the above-mentioned embodiment and the modifications thereof is applicable to electronic devices such as, in addition to the above-described mobile phone and the like, a personal computer, a liquid crystal television, a view-finder type or a direct-view type video recorder, a car navigation system, a pager, an electronic notebook, a calculator, a word processor, a workstation, a television-phone, a POS terminal and the like.

It is possible to achieve at least the following configurations from the example embodiments and the example modifications of the present technology described above.

(1) A display panel including:
a panel section including a plurality of pixels disposed in a row direction and a column direction; and
a barrier section including light blocking regions and light transmitting regions alternately disposed in the row direction and the column direction, wherein
each of the pixels emits light of four colors, and has two sub-pixels for each of the four colors.

(2) The display panel according to (1), wherein
two sub-pixels of the same color among the four colors provided in each of the pixels are continuously disposed in the row direction or the column direction in each of the pixels, or continuously disposed in the row direction or the column direction all over the pixels.

(3) The display panel according to (1) or (2), wherein
each of the pixels emits light of red, green, blue, and white, or light of red, green, blue, and yellow.

(4) A display including:
a panel section including a plurality of pixels disposed in a row direction and a column direction;
a barrier section including light blocking regions and light transmitting regions alternately disposed in the row direction and the column direction; and
a driving section driving the panel section or both of the panel section and the barrier section, wherein
each of the pixels emits light of four colors, and has two sub-pixels for each of the four colors.

(5) An electronic device with a display, the display including:
a panel section including a plurality of pixels disposed in a row direction and a column direction;

a barrier section including light blocking regions and light transmitting regions alternately disposed in the row direction and athe column direction; and a driving section driving the panel section or both of the panel section and the barrier section, wherein each of the pixels emits light of four colors, and has two sub-pixels for each of the four colors.

The present disclosure contains subject matter related to that disclosed in Japanese Priority Patent Application JP 2011-91845 filed in the Japan Patent Office on Apr. 18, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display panel comprising:
   a panel section including a plurality of pixels disposed in a row direction and a column direction; and
   a barrier section including light blocking regions and light transmitting regions alternately disposed in the row direction and the column direction, the barrier section being disposed at a viewer side of the panel section,
   wherein,
      each of the pixels emits light of four different colors, and has two sub-pixels for each of the four different colors,
      two sub-pixels of the same color are continuously disposed in the row direction or the column direction in each of the pixels or over the pixels adjacent to each other,
      when viewed from a given point of view, only one sub-pixel among the two sub-pixels of the same color continuously disposed in the row direction or the column direction can be seen via the barrier section, and
      sub-pixels having the same color among sub-pixels that can be seen via the barrier section are not arranged continuously in the row direction and the column direction.

2. The display panel according to claim 1, wherein each of the pixels emits (i) light of red, green, blue, and white, or (ii) light of red, green, blue, and yellow.

3. A display comprising:
   a panel section including a plurality of pixels disposed in a row direction and a column direction;
   a barrier section including light blocking regions and light transmitting regions alternately disposed in the row direction and the column direction, the barrier section being disposed at a viewer side of the panel section; and
   a driving section driving the panel section or both of the panel section and the barrier section,
   wherein,
      each of the pixels emits light of four different colors, and has two sub-pixels for each of the four different colors,
      two sub-pixels of the same color are continuously disposed in the row direction or the column direction in each of the pixels or over the pixels adjacent to each other,
      when viewed from a given point of view, only one sub-pixel among the two sub-pixels of the same color continuously disposed in the row direction or the column direction can be seen via the barrier section, and
      sub-pixels having the same color among sub-pixels that can be seen via the barrier section are not arranged continuously in the row direction and the column direction.

4. An electronic device comprising a display, the display including:
   a panel section including a plurality of pixels disposed in a row direction and a column direction;
   a barrier section including light blocking regions and light transmitting regions alternately disposed in the row direction and the column direction, the barrier section being disposed at a viewer side of the panel section; and
   a driving section driving the panel section or both of the panel section and the barrier section,
   wherein,
      each of the pixels emits light of four different colors, and has two sub-pixels for each of the four different colors,
      two sub-pixels of the same color are continuously disposed in the row direction or the column direction in each of the pixels or over the pixels adjacent to each other,
      when viewed from a given point of view, only one sub-pixel among the two sub-pixels of the same color continuously disposed in the row direction or the column direction can be seen via the barrier section, and
      sub-pixels having the same color among sub-pixels that can be seen via the barrier section are not arranged continuously in the row direction and the column direction.

5. A display panel comprising:
   a panel section including a plurality of pixels disposed in a row direction and a column direction; and
   a barrier section including light blocking regions and light transmitting regions alternately disposed in the row direction and the column direction, the barrier section being disposed at a viewer side of the panel section,
   wherein,
      each of the pixels emits light of four different colors, and has two sub-pixels for each of the four different colors,
      only two of the four different colors are disposed along each row or each column,
      two sub-pixels of the same color are repetitively disposed adjacent to each other along each row or each column,
      when viewed from a given point of view, only one sub-pixel among the two sub-pixels of the same color repetitively disposed adjacent to each other along each row or each column can be seen via the barrier section, and
      sub-pixels having the same color among sub-pixels that can be seen via the barrier section are not arranged continuously in the row direction and the column direction.

6. The display panel according to claim 5, wherein the two sub-pixels of the same color are from the same pixel.

* * * * *